(12) United States Patent
Makiuchi

(10) Patent No.: US 9,423,919 B2
(45) Date of Patent: Aug. 23, 2016

(54) TOUCH PANEL

(71) Applicant: FUJITSU COMPONENT LIMITED, Tokyo (JP)

(72) Inventor: Yuji Makiuchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 82 days.

(21) Appl. No.: 14/627,086

(22) Filed: Feb. 20, 2015

(65) Prior Publication Data

US 2015/0242023 A1 Aug. 27, 2015

(30) Foreign Application Priority Data

Feb. 25, 2014 (JP) ................. 2014-034476

(51) Int. Cl.
*G06F 3/045* (2006.01)

(52) U.S. Cl.
CPC ...... *G06F 3/045* (2013.01); *G06F 2203/04104* (2013.01)

(58) Field of Classification Search
CPC .......... G06F 3/045; G06F 2203/04104; G06F 3/0416
See application file for complete search history.

(56) References Cited

U.S. PATENT DOCUMENTS

| 6,278,444 | B1 * | 8/2001 | Wilson | G06F 3/045 |
| | | | | 178/18.01 |
| 7,254,775 | B2 | 8/2007 | Geaghan et al. | |
| 8,106,892 | B2 | 1/2012 | Felder et al. | |
| 2009/0189877 | A1 | 7/2009 | Washino et al. | |
| 2011/0012861 | A1 * | 1/2011 | Yeh | G06F 3/0416 |
| | | | | 345/174 |
| 2011/0157083 | A1 | 6/2011 | Hershman et al. | |
| 2012/0268419 | A1 | 10/2012 | Matsuda et al. | |

FOREIGN PATENT DOCUMENTS

| JP | H11-353101 | 12/1999 |
| JP | 2004-272722 | 9/2004 |
| JP | 2005-505065 | 2/2005 |
| JP | 2008-293129 | 12/2008 |
| JP | 2009-176114 | 8/2009 |
| JP | 2011-502314 | 1/2011 |
| JP | 2012-141941 | 7/2012 |
| JP | 2012-230504 | 11/2012 |

\* cited by examiner

*Primary Examiner* — Lun-Yi Lao
*Assistant Examiner* — Jarurat Suteerrawongsa
(74) *Attorney, Agent, or Firm* — IPUSA, PLLC

(57) ABSTRACT

A touch panel includes an upper electrode substrate having a rectangular shape and having an upper conductive film formed thereon, a lower electrode substrate having a rectangular shape and having a lower conductive film formed thereon, a first power feeding terminal, a second power feeding terminal, a third power feeding terminal, and a fourth power feeding terminal disposed on the lower conductive film at four respective corners of the lower electrode substrate, a first potential detecting unit configured to detect a potential of the second power feeding terminal, a second potential detecting unit configured to detect a potential of the fourth power feeding terminal, and a third potential detecting unit configured to detect a potential of the third power feeding terminal.

6 Claims, 7 Drawing Sheets

FIG.12A

| | SW1 | SW2 | SW13 | SW14 | SW15 | SW16 | SW47 | SW48 | SW49 | SW50 |
|---|---|---|---|---|---|---|---|---|---|---|
| X DIRECTION | ON | OFF | OFF | OFF | ON | ON | OFF | OFF | OFF | ON |
| Y DIRECTION | OFF | ON | ON | ON | OFF | OFF | OFF | OFF | OFF | ON |

FIG.12B

| | SW1 | SW2 | SW13 | SW14 | SW15 | SW16 | SW47 | SW48 | SW49 | SW50 |
|---|---|---|---|---|---|---|---|---|---|---|
| X DIRECTION | ON | OFF | OFF | OFF | OFF | OFF | OFF | ON | ON | ON |
| Y DIRECTION | OFF | ON | OFF | OFF | OFF | OFF | ON | OFF | ON | ON |

FIG.12C

| | SW1 | SW2 | SW13 | SW14 | SW15 | SW16 | SW47 | SW48 | SW49 | SW50 |
|---|---|---|---|---|---|---|---|---|---|---|
| SAMPLING IN X DIRECTION | ON | OFF | OFF | OFF | ON | ON | OFF | OFF | OFF | ON |
| SAMPLING IN Y DIRECTION | OFF | ON | ON | ON | OFF | OFF | OFF | OFF | OFF | ON |

TOUCH PANEL

BACKGROUND OF THE INVENTION

1. Field of the Invention

The disclosures herein relate to a touch panel.

2. Description of the Related Art

A touch panel (i.e., touchscreen panel) is an input device that allows input to be directly entered into a display, and is placed in front of the display. Touch panels are widely used in various applications because of their capability of allowing direct inputting based on visual information provided by the display.

A resistive-type touch panel is widely known in the art. The resistive-type touch panel includes an upper electrode substrate and a lower electrode substrate having respective transparent conductive films. These substrates are arranged such that the corresponding transparent conductive films face each other. When pressure is applied to a point on the upper electrode substrate, the transparent conductive films are brought into contact with each other, thereby allowing the position of the pressed point to be detected.

The resistive-type touch panel is classified into a four-wire-type and a five-wire-type. In the four-wire-type, X-axis electrodes are disposed on one of the upper electrode substrate and the lower electrode substrate, and Y-axis electrodes are disposed on the other substrate (see Patent Document 1, for example). In the five-wire-type, X-axis electrodes and Y-axis electrodes are both disposed on the lower electrode substrate while the upper electrode substrate serves as a probe for detecting voltage (see Patent Document 2, for example).

The four-wire-type touch panels include those which allow multiple points of contact to be detected (see Patent Document 4, for example).

There is no five-wire-type touch panel that allows multiple points of contact to be readily detected.

Accordingly, it may be desirable to provide a five-wire-type touch panel that allows multiple points of contact to be readily detected.

[Patent Document 1] Japanese Laid-open Patent Publication No. 2004-272722

[Patent Document 2] Japanese Laid-open Patent Publication No. 2008-293129

[Patent Document 3] Japanese Laid-open Patent Publication No. H11-353101

[Patent Document 4] Japanese Laid-open Patent Publication No. 2009-176114

[Patent Document 5] Japanese Laid-open Patent Publication No. 2012-230504

[Patent Document 6] Japanese Laid-open Patent Publication No. 2012-141941

[Patent Document 7] Japanese National Publication of International Patent Application No. 2005-505065

[Patent Document 8] Japanese National Publication of International Patent Application No. 2011-502314

SUMMARY OF THE INVENTION

According to an embodiment, a touch panel includes an upper electrode substrate having a rectangular shape and having an upper conductive film formed thereon, a lower electrode substrate having a rectangular shape and having a lower conductive film formed thereon, a first power feeding terminal, a second power feeding terminal, a third power feeding terminal, and a fourth power feeding terminal disposed on the lower conductive film at four respective corners of the lower electrode substrate, a first switch situated between the second power feeding terminal and a ground potential, a second switch situated between the third power feeding terminal and the ground potential, a first resistor and a third switch that are series-connected between the second power feeding terminal and a power supply potential, a first potential detecting unit configured to detect a potential of the second power feeding terminal, a second resistor and a fourth switch that are series-connected between the fourth power feeding terminal and the power supply potential, a second potential detecting unit configured to detect a potential of the fourth power feeding terminal, a third resistor and a fifth switch that are series-connected between the third power feeding terminal and the power supply potential, and a third potential detecting unit configured to detect a potential of the third power feeding terminal.

According to an embodiment, a touch panel includes an upper electrode substrate having a rectangular shape and having an upper conductive film formed thereon, a lower electrode substrate having a rectangular shape and having a lower conductive film formed thereon, a first power feeding terminal, a second power feeding terminal, a third power feeding terminal, and a fourth power feeding terminal disposed on the lower conductive film at four respective corners of the lower electrode substrate, a first switch situated between the second power feeding terminal and a ground potential, a second switch situated between the third power feeding terminal and the ground potential, a third switch having a first terminal thereof coupled to the second power feeding terminal, a fourth switch having a first terminal thereof coupled to the fourth power feeding terminal, a first resistor having a first end thereof coupled to a second terminal of the third switch and to a second terminal of the fourth switch, a first potential detecting unit configured to detect a potential at a point between the first end of the first resistor and both the second terminal of the third switch and the second terminal of the fourth switch, a fifth switch having a first terminal thereof coupled to the fourth power feeding terminal, a sixth switch having a first terminal thereof coupled to the third power feeding terminal, a second resistor having a first end thereof coupled to a second terminal of the fifth switch and to a second terminal of the sixth switch, and a second potential detecting unit configured to detect a potential at a point between the first end of the second resistor and both the second terminal of the fifth switch and the second terminal of the sixth switch, wherein a second terminal of the first resistor and a second terminal of the second resistor are coupled to a power supply potential.

According to an embodiment, a touch panel includes an upper electrode substrate having a rectangular shape and having an upper conductive film formed thereon, a lower electrode substrate having a rectangular shape and having a lower conductive film formed thereon, a first power feeding terminal, a second power feeding terminal, a third power feeding terminal, and a fourth power feeding terminal disposed on the lower conductive film at four respective corners of the lower electrode substrate, a first potential detecting unit configured to detect at least one of a potential of the third power feeding terminal and a potential of the fourth power feeding terminal when the third and fourth power feeding terminals are coupled to a first potential, and the first and second power feeding terminals are coupled to a second potential, a second potential detecting unit configured to detect at least one of a potential of the second power feeding terminal and a potential of the fourth power feeding terminal when the second and fourth power feeding terminals are coupled to the first potential, and the first and third power feeding terminals are coupled to the second potential, and a third potential detecting unit configured to detect a potential of the upper conductive film.

According to at least one embodiment, a five-wire-type touch panel is provided that allows multiple points of contact to be readily detected.

BRIEF DESCRIPTION OF THE DRAWINGS

Other objects and further features of the present invention will be apparent from the following detailed description when read in conjunction with the accompanying drawings, in which:

FIGS. 12A through 12C are illustrative drawings of a method of controlling the touch panel of the fifth embodiment.

DESCRIPTION OF EMBODIMENTS

In the following, embodiments will be described by referring to the accompanying drawings. The same or similar elements are referred to by the same or similar numerals.

First Embodiment

In the following, a description will be given of a touch panel according to a first embodiment. This embodiment is directed to a five-wire-type touch panel that is capable of detecting two contact points.

Figure 1:
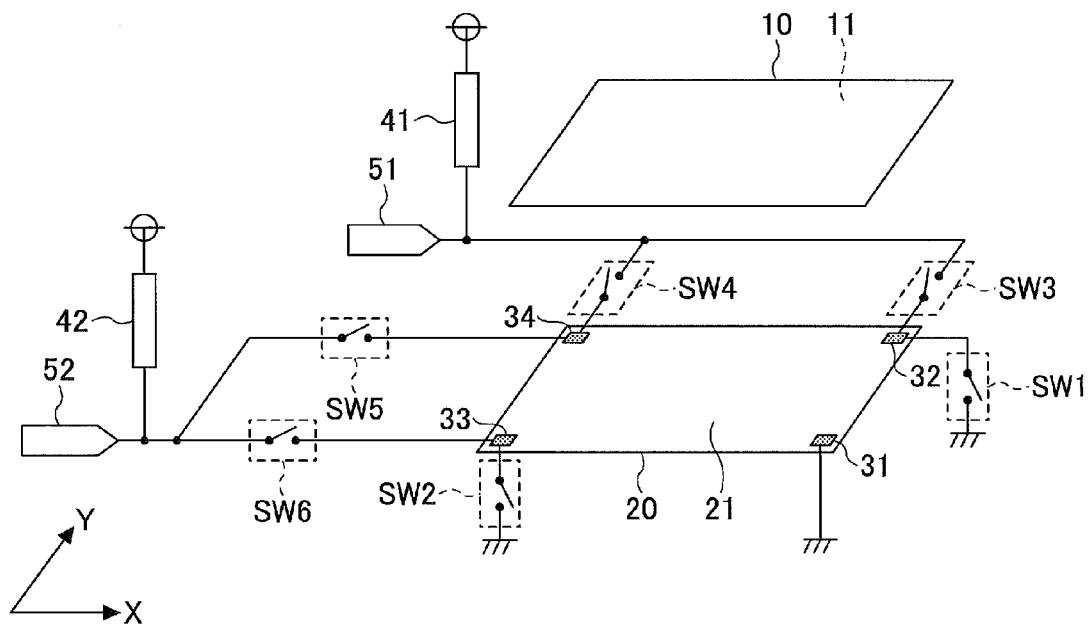
FIG. 1 is a drawing illustrating the structure of a touch panel of a first embodiment.

With reference to FIG. 1, a description will be given of a touch panel according to the present embodiment. The touch panel of the present embodiment includes an upper electrode substrate 10 and a lower electrode substrate 20. The upper electrode substrate 10 is a rectangular substrate made of glass or transparent resin material that has a transparent conductive film 11 made of ITO (Indium Tin Oxide) or the like formed thereon to serve as an upper conductive film. The lower electrode substrate 20 is a rectangular substrate made of glass or transparent resin material that has a transparent conductive film 21 made of ITO (Indium Tin Oxide) or the like formed thereon to serve as a lower conductive film. The upper electrode substrate 10 and the lower electrode substrate 20 are placed such that the transparent conductive film 11 and the transparent conductive film 21 face each other.

The four corners of the lower electrode substrate 20 have a first power feeding terminal 31, a second power feeding terminal 32, a third power feeding terminal 33, and a fourth power feeding terminal 34 formed on the transparent conductive film 21. In the present embodiment, the straight line connecting between the first power feeding terminal 31 and the second power feeding terminal 32 and the straight line connecting between the third power feeding terminal 33 and the fourth power feeding terminal 34 are both parallel to the Y axis. Further, the straight line connecting between the first power feeding terminal 31 and the third power feeding terminal 33 and the straight line connecting between the second power feeding terminal 32 and the fourth power feeding terminal 34 are both parallel to the X axis.

The first power feeding terminal 31 is coupled to the ground, and receives a voltage of 0 V. The second power feeding terminal 32 is coupled to a first terminal of a first switch SW1, and a second terminal of the first switch SW1 is coupled to the ground potential. The third power feeding terminal 33 is coupled to a first terminal of a second switch SW2, and a second terminal of the second switch SW2 is coupled to the ground potential.

The second power feeding terminal 32 is coupled to the power supply potential through a third switch SW3 and a first resistor 41 that are series-connected. The third power feeding terminal 33 is coupled to the power supply potential through a sixth switch SW6 and a second resistor 42 that are series-connected. The fourth power feeding terminal 34 is coupled to the power supply potential through a fourth switch SW4 and the first resistor 41 that are series-connected. The fourth power feeding terminal 34 is further coupled to the power supply potential through a fifth switch SW5 and the second resistor 42 that are series-connected.

Namely, the second power feeding terminal 32 is coupled to a first terminal of the third switch SW3, and the fourth power feeding terminal 34 is coupled to a first terminal of the fourth switch SW4, with a second terminal of the third switch SW3 and a second terminal of the fourth switch SW4 being coupled to each other. Further, the second terminal of the third switch SW3 and the second terminal of the fourth switch SW4 are coupled to one end of the first resistor 41, and the other end of the first resistor 41 is coupled to the power supply potential. Moreover, a first potential detecting unit 51 is coupled to a connection point between the second terminal of the third switch SW3, the second terminal of the fourth switch SW4, and the above-noted one end of the first resistor 41.

The third power feeding terminal 33 is coupled to a first terminal of the sixth switch SW6, and the fourth power feeding terminal 34 is coupled to a first terminal of the fifth switch SW5, with a second terminal of the sixth switch SW6 and a second terminal of the fifth switch SW5 being coupled to each other. Further, the second terminal of the sixth switch SW6 and the second terminal of the fifth switch SW5 are coupled to one end of the second resistor 42, and the other end of the second resistor 42 is coupled to the power supply potential. Moreover, a second potential detecting unit 52 is coupled to a connection point between the second terminal of the sixth switch SW6, the second terminal of the fifth switch SW5, and the above-noted one end of the second resistor 42.

Figure 2:
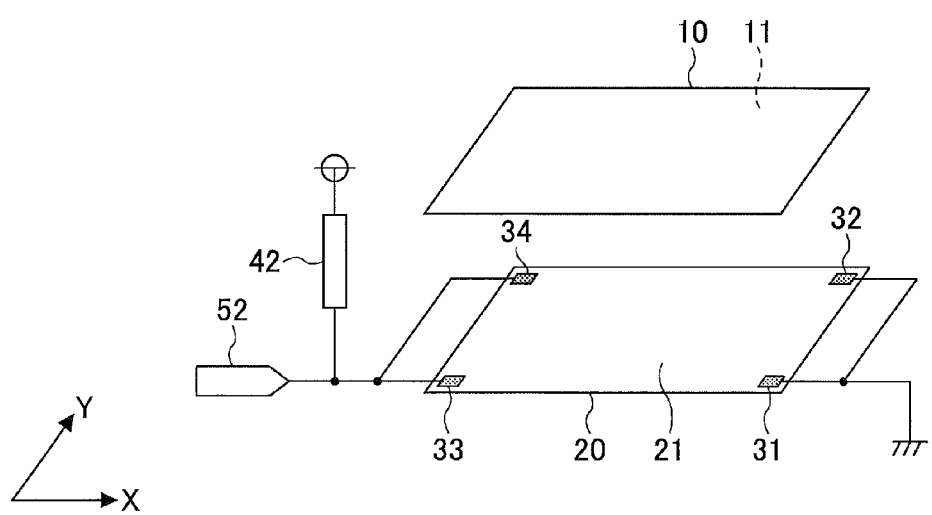
FIG. 2 is an illustrative drawing of the touch panel of the first embodiment.

In order to perform a measurement in the X-axis direction in the touch panel of the present embodiment, the first switch SW1 is closed, and the second switch SW2 is open, with the third switch SW3 and the fourth switch SW4 being open, and the fifth switch SW5 and the sixth switch SW6 being closed. With this arrangement, as illustrated in FIG. 2, the first power feeding terminal 31 and the second power feeding terminal 32 are coupled to the ground, and the third power feeding terminal 33 and the fourth power feeding terminal 34 are coupled to the power supply potential through the second resistor 42. As a result, the transparent conductive film 21 of the lower electrode substrate 20 has a potential gradient in the X-axis direction.

Figure 3:
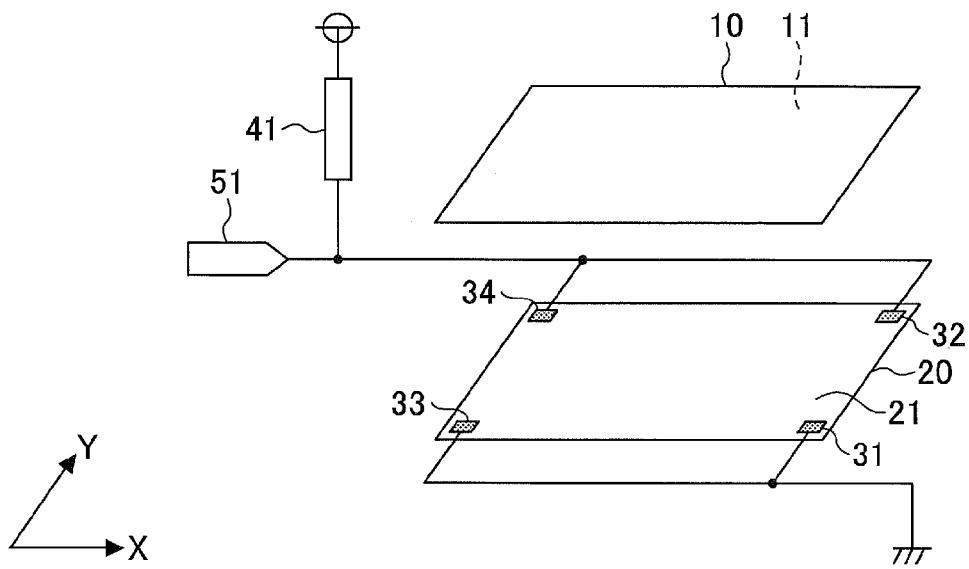
FIG. 3 is an illustrative drawing of the touch panel of the first embodiment.

In order to perform a measurement in the Y-axis direction in the touch panel of the present embodiment, the first switch SW1 is open, and the second switch SW2 is closed, with the third switch SW3 and the fourth switch SW4 being closed, and the fifth switch SW5 and the sixth switch SW6 being open. With this arrangement, as illustrated in FIG. 3, the first power feeding terminal 31 and the third power feeding terminal 33 are coupled to the ground, and the second power feeding terminal 32 and the fourth power feeding terminal 34 are coupled to the power supply potential through the first resistor 41. As a result, the transparent conductive film 21 of the lower electrode substrate 20 has a potential gradient in the Y-axis direction.

In the touch panel of the present embodiment, as illustrated in FIG. 2, a potential gradient is generated in the X-axis direction, and the second potential detecting unit 52 is used to detect a voltage divided by the second resistor 42 and the resistance of the touch panel. With the resistance of the second resistor 42 being known, the resistance of the touch panel is derived from the detected divided voltage. The resistance of the touch panel is the resistance of the transparent conductive film 21 in the X-axis direction between the pair of the third power feeding terminal 33 and the fourth power feeding terminal 34 and the pair of the first power feeding terminal 31 and the second power feeding terminal 32 when there is no touch or when there is a single point of touch. It may be noted that in the case of pressure being applied at a single point on the upper electrode substrate 10, the transparent conductive film 11 and the transparent conductive film 21 come in contact with each other only at this single point of touch. The resistance of the touch panel as measured by the above-noted configuration is not affected by the presence of such a single point touch.

In the case of pressure being applied at two points on the upper electrode substrate 10, on the other hand, the transparent conductive film 11 and the transparent conductive film 21 come in contact with each other at these two points of touch, between which a portion of the transparent conductive film 11 and a portion of the transparent conductive film 21 are parallel-connected to form parallel-connected resistances. The resistance of the touch panel as measured by the above-noted configuration thus involves such parallel-connected resistances, and is responsive to the distance between the two points of touch.

Further, as illustrated in FIG. 3, a potential gradient is generated in the Y-axis direction, and the first potential detecting unit 51 is used to detect a voltage divided by the first resistor 41 and the resistance of the touch panel. With the resistance of the first resistor 41 being known, the resistance of the touch panel is derived from the detected divided voltage. The resistance of the touch panel is the resistance of the transparent conductive film 21 in the Y-axis direction between the pair of the second power feeding terminal 32 and the fourth power feeding terminal 34 and the pair of the first power feeding terminal 31 and the third power feeding terminal 33 when there is no touch or when there is a single point of touch. The resistance of the touch panel as measured by the above-noted configuration is not affected by the presence of a single point touch.

In the case of pressure being applied at two points on the upper electrode substrate 10, on the other hand, the transparent conductive film 11 and the transparent conductive film 21 come in contact with each other at these two points of touch, between which a portion of the transparent conductive film 11 and a portion of the transparent conductive film 21 are parallel-connected to form parallel-connected resistances. The resistance of the touch panel as measured by the above-noted configuration thus involves such parallel-connected resistances, and is responsive to the distance between the two points of touch.

Figure 4:
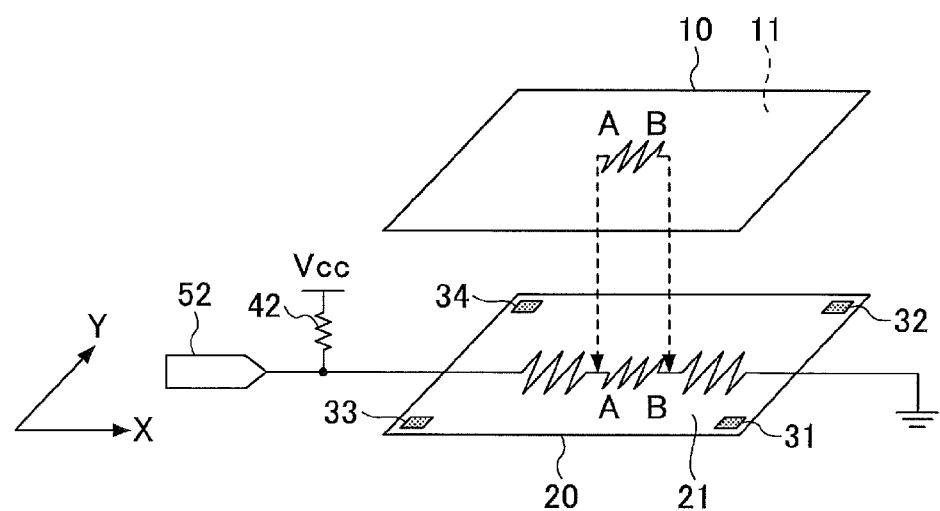
FIG. 4 is an illustrative drawing of the touch panel of the first embodiment.
Figure 5:
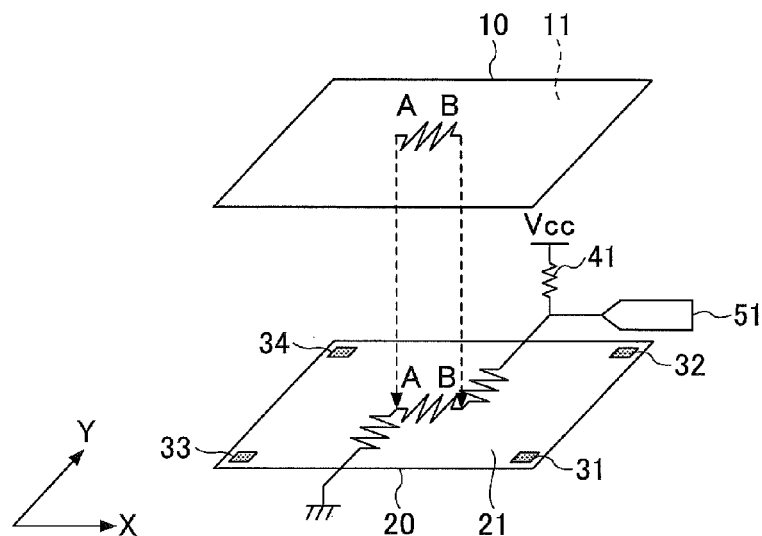
FIG. 5 is an illustrative drawing of the touch panel of the first embodiment.

With the above-described arrangement, the distance as well as a change in the distance between two points of contact such as points A and B illustrated in FIG. 4 and FIG. 5, for example, are detectable based on the resistance between the point A and the point B. This arrangement thus enables the detection of a multi-touch operation. FIG. 4 illustrates a case in which the second potential detecting unit 52 detects a potential when a potential gradient in the X-axis direction is generated as illustrated in FIG. 2. FIG. 5 illustrates a case in which the first potential detecting unit 51 detects a potential when a potential gradient in the Y-axis direction is generated as illustrated in FIG. 3.

Second Embodiment

In the following, a description will be given of a touch panel according to a second embodiment. This embodiment is directed to a five-wire-type touch panel which includes the upper electrode substrate 10 and the lower electrode substrate 20, and which enables the detection of positions of two contact points when there are two points of touch on the touch panel. With this arrangement, multi-touch gestures can be identified when there are two points of touch on the touch panel.

Figure 6:
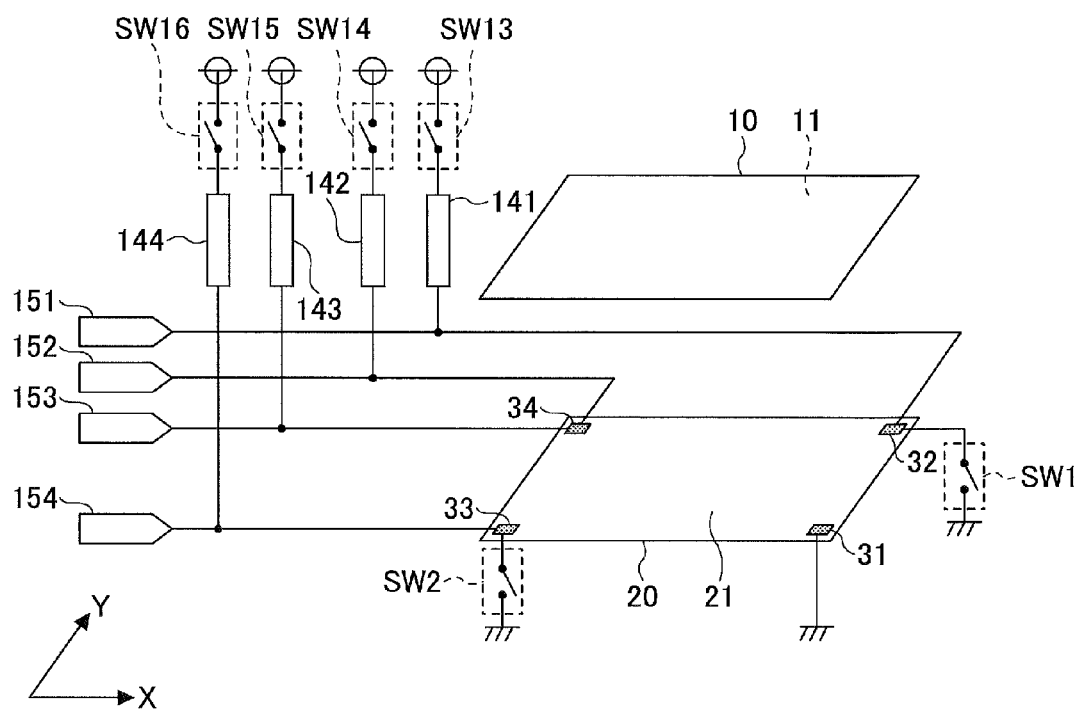
FIG. 6 is a drawing illustrating the structure of a touch panel of a second embodiment.

With reference to FIG. 6, a description will be given of a touch panel according to the present embodiment. In the touch panel of the present embodiment, the upper electrode substrate 10 is a rectangular substrate made of glass or transparent resin material that has a transparent conductive film 11 made of ITO or the like formed thereon to serve as an upper conductive film. The lower electrode substrate 20 is a rectangular substrate made of glass or transparent resin material that has a transparent conductive film 21 made of ITO (Indium Tin Oxide) or the like formed thereon to serve as a lower conductive film. The upper electrode substrate 10 and the lower electrode substrate 20 are placed such that the transparent conductive film 11 and the transparent conductive film 21 face each other.

The four corners of the lower electrode substrate 20 have a first power feeding terminal 31, a second power feeding terminal 32, a third power feeding terminal 33, and a fourth power feeding terminal 34 formed on the transparent conductive film 21. In the present embodiment, the straight line connecting between the first power feeding terminal 31 and the second power feeding terminal 32 and the straight line connecting between the third power feeding terminal 33 and the fourth power feeding terminal 34 are both parallel to the Y axis. Further, the straight line connecting between the first power feeding terminal 31 and the third power feeding terminal 33 and the straight line connecting between the second power feeding terminal 32 and the fourth power feeding terminal 34 are both parallel to the X axis.

The first power feeding terminal 31 is coupled to the ground, and receives a voltage of 0 V. The second power feeding terminal 32 is coupled to a first terminal of a first switch SW1, and a second terminal of the first switch SW1 is coupled to the ground potential. The third power feeding terminal 33 is coupled to a first terminal of a second switch SW2, and a second terminal of the second switch SW2 is coupled to the ground potential.

The second power feeding terminal 32 is coupled to the power supply potential through a first resistor 141 and a third switch SW13 that are series-connected. The third power feeding terminal 33 is coupled to the power supply potential through a fourth resistor 144 and a sixth switch SW16 that are series-connected. The fourth power feeding terminal 34 is coupled to the power supply potential through a second resistor 142 and a fourth switch SW14 that are series-connected. The fourth power feeding terminal 34 is also coupled to the power supply potential through a third resistor 143 and a fifth switch SW15 that are series-connected.

Namely, the second power feeding terminal 32 is coupled to one end of the first resistor 141, and the other end of the first resistor 141 is coupled to a first terminal of the third switch SW13, with a second terminal of the third switch SW13 being coupled to the power supply potential. Further, a connection point between the second power feeding terminal 32 and the above-noted one end of the first resistor 141 is coupled to a first potential detecting unit 151. With this arrangement, the first potential detecting unit 151 detects the potential of the second power feeding terminal 32.

Moreover, the third power feeding terminal 33 is coupled to one end of the fourth resistor 144, and the other end of the fourth resistor 144 is coupled to a first terminal of the sixth switch SW16, with a second terminal of the sixth switch SW16 being coupled to the power supply potential. Further, a connection point between the third power feeding terminal 33 and the above-noted one end of the fourth resistor 144 is coupled to a fourth potential detecting unit 154. With this arrangement, the fourth potential detecting unit 154 detects the potential of the third power feeding terminal 33.

Moreover, the fourth power feeding terminal 34 is coupled to one end of the second resistor 142, and the other end of the second resistor 142 is coupled to a first terminal of the fourth switch SW14, with a second terminal of the fourth switch SW14 being coupled to the power supply potential. Further, a connection point between the fourth power feeding terminal 34 and the above-noted one end of the second resistor 142 is coupled to a second potential detecting unit 152. With this arrangement, the second potential detecting unit 152 detects the potential of the fourth power feeding terminal 34.

Moreover, the fourth power feeding terminal 34 is coupled to one end of the third resistor 143, and the other end of the third resistor 143 is coupled to a first terminal of the fifth switch SW15, with a second terminal of the fifth switch SW15 being coupled to the power supply potential. Further, a connection point between the fourth power feeding terminal 34 and the above-noted one end of the third resistor 143 is coupled to a third potential detecting unit 153. With this arrangement, the third potential detecting unit 153 detects the potential of the fourth power feeding terminal 34.

Figure 7:
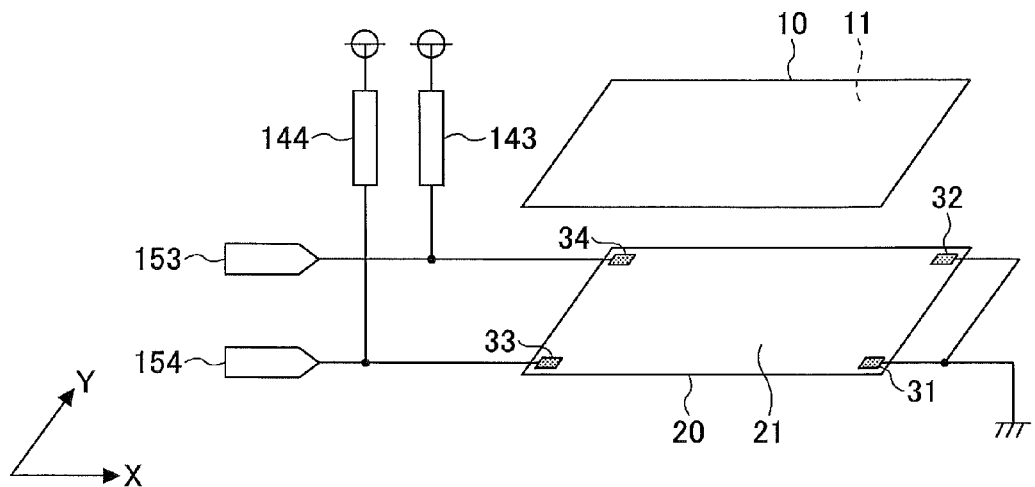
FIG. 7 is an illustrative drawing of the touch panel of the second embodiment.

In order to perform a measurement in the X-axis direction in the present embodiment, the first switch SW1 is closed, and the second switch SW2 is open, with the third switch SW13 and the fourth switch SW14 being open, and the fifth switch SW15 and the sixth switch SW16 being closed. With this arrangement, as illustrated in FIG. 7, the first power feeding terminal 31 and the second power feeding terminal 32 are coupled to the ground, with the third power feeding terminal 33 being coupled to the power supply potential through the fourth resistor 144, and the fourth power feeding terminal 34 being coupled to the power supply potential through the third resistor 143. As a result, the transparent conductive film 21 of the lower electrode substrate 20 has a potential gradient in the X-axis direction. In this state, the third potential detecting unit 153 and the fourth potential detecting unit 154 perform potential detections.

Figure 8:
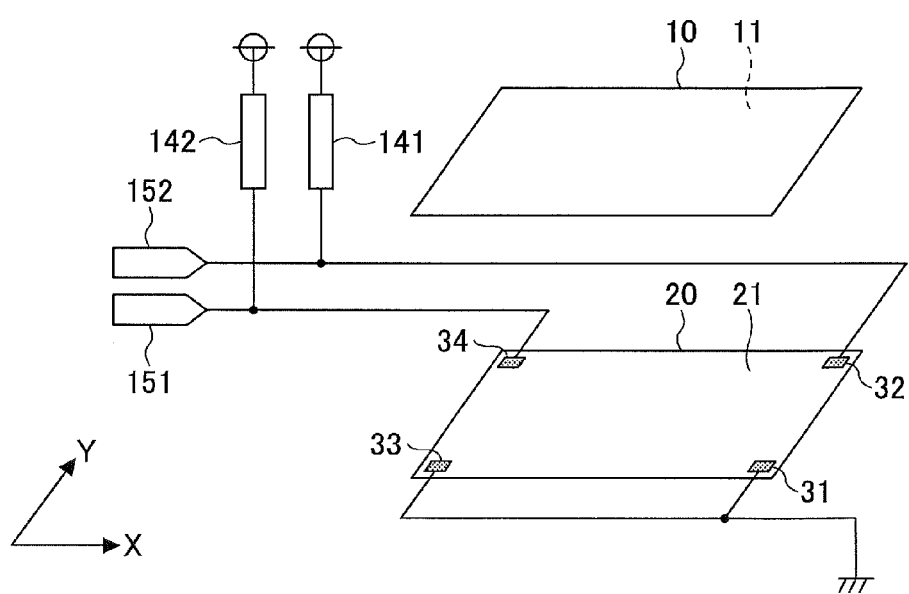
FIG. 8 is an illustrative drawing of the touch panel of the second embodiment.

In order to perform a measurement in the Y-axis direction, the first switch SW1 is open, and the second switch SW2 is closed, with the third switch SW13 and the fourth switch SW14 being closed, and the fifth switch SW15 and the sixth switch SW16 being open. With this arrangement, as illustrated in FIG. 8, the first power feeding terminal 31 and the third power feeding terminal 33 are coupled to the ground, with the second power feeding terminal 32 being coupled to the power supply potential through the first resistor 141, and the fourth power feeding terminal 34 being coupled to the power supply potential through the second resistor 142. As a result, the transparent conductive film 21 of the lower electrode substrate 20 has a potential gradient in the Y-axis direction. In this state, the first potential detecting unit 151 and the second potential detecting unit 152 perform potential detections.

Subsequently, the coordinate positions of two points of touch on the touch panel are calculated based on the respective potentials detected by the third potential detecting unit 153 and the fourth potential detecting unit 154 and the respective potentials detected by the first potential detecting unit 151 and the second potential detecting unit 152. With this arrangement, multi-touch gestures can be identified when there are two points of touch.

In the present embodiment, the first resistor 141 may have a resistance equal to the resistance between the second power feeding terminal 32 and the first power feeding terminal 31, and the second resistor 142 may have a resistance equal to the resistance between the fourth power feeding terminal 34 and the third power feeding terminal 33. Further, the third resistor 143 may have a resistance equal to the resistance between the fourth power feeding terminal 34 and the second power feeding terminal 32, and the fourth resistor 144 may have a resistance equal to the resistance between the third power feeding terminal 33 and the first power feeding terminal 31.

Third Embodiment

In the following, a description will be given of a touch panel according to a third embodiment. The touch panel of this embodiment is directed to a configuration in which the numbers of resistors, potential detecting units, and switches are reduced compared with the touch panel of the second embodiment. The present embodiment thus provides a touch panel having the same or similar functions as the touch panel of the second embodiment at a lower cost.

Figure 9:
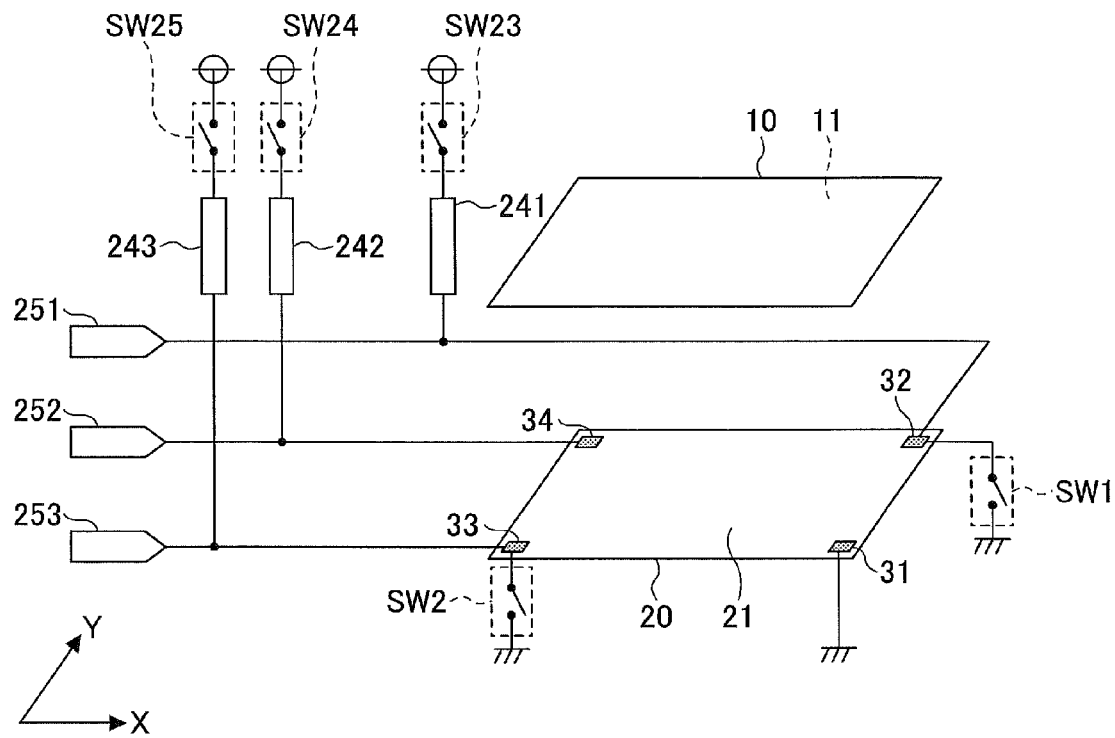
FIG. 9 is a drawing illustrating the structure of a touch panel of a third embodiment.

With reference to FIG. 9, a description will be given of the touch panel according to the present embodiment. In the touch panel of the present embodiment, the first power feeding terminal 31 is coupled to the ground, and receives a voltage of 0 V. The second power feeding terminal 32 is coupled to a first terminal of a first switch SW1, and a second terminal of the first switch SW1 is coupled to the ground potential. The third power feeding terminal 33 is coupled to a first terminal of a second switch SW2, and a second terminal of the second switch SW2 is coupled to the ground potential.

The second power feeding terminal 32 is coupled to the power supply potential through a first resistor 241 and a third switch SW23 that are series-connected. The third power feeding terminal 33 is also coupled to the power supply potential through a third resistor 243 and a fifth switch SW25 that are series-connected. The fourth power feeding terminal 34 is coupled to the power supply potential through a second resistor 242 and a fourth switch SW24 that are series-connected.

Namely, the second power feeding terminal 32 is coupled to one end of the first resistor 241, and the other end of the first resistor 241 is coupled to a first terminal of the third switch SW23, with a second terminal of the third switch SW23 being coupled to the power supply potential. Further, a connection point between the second power feeding terminal 32 and the above-noted one end of the first resistor 241 is coupled to a first potential detecting unit 251. With this arrangement, the first potential detecting unit 251 detects the potential of the second power feeding terminal 32.

Moreover, the third power feeding terminal 33 is coupled to one end of the third resistor 243, and the other end of the third resistor 243 is coupled to a first terminal of the fifth switch SW25, with a second terminal of the fifth switch SW25 being coupled to the power supply potential. Further, a connection point between the third power feeding terminal 33 and the above-noted one end of the third resistor 243 is coupled to a third potential detecting unit 253. With this arrangement, the third potential detecting unit 253 detects the potential of the third power feeding terminal 33.

Moreover, the fourth power feeding terminal 34 is coupled to one end of the second resistor 242, and the other end of the second resistor 242 is coupled to a first terminal of the fourth switch SW24, with a second terminal of the fourth switch SW24 being coupled to the power supply potential. Further, a connection point between the fourth power feeding terminal 34 and the above-noted one end of the second resistor 242 is coupled to a second potential detecting unit 252. With this arrangement, the second potential detecting unit 252 detects the potential of the fourth power feeding terminal 34.

In other words, the present embodiment uses the second potential detecting unit 252 that serves the functions of both the second potential detecting unit 152 and the third potential detecting unit 153 of the second embodiment. Further, the second resistor 242 serves the functions of both the second resistor 142 and the third resistor 143 of the second embodiment. The fourth switch SW24 serves the functions of both the fourth switch SW14 and the fifth switch SW15 of the second embodiment.

In the present embodiment, the first resistor 241 may have a resistance equal to the resistance between the second power feeding terminal 32 and the first power feeding terminal 31, and the second resistor 242 may have a resistance equal to the resistance between the fourth power feeding terminal 34 and the third power feeding terminal 33. Further, the third resistor 243 may have a resistance equal to the resistance between the fourth power feeding terminal 34 and the second power feeding terminal 32, or may have a resistance equal to the resistance between the third power feeding terminal 33 and the first power feeding terminal 31.

Further, the first resistor 241 of the present embodiment corresponds to the first resistor 141 of the second embodiment, and the third resistor 243 corresponds to the fourth resistor 144 of the second embodiment. Further, the third switch SW23 of the present embodiment corresponds to the third switch SW13 of the second embodiment, and the fifth switch SW25 corresponds to the sixth switch SW16 of the second embodiment. Further, the first potential detecting unit 251 of the present embodiment corresponds to the first potential detecting unit 151 of the second embodiment, and the third potential detecting unit 253 corresponds to the fourth potential detecting unit 154 of the second embodiment.

In the present embodiment, the second resistor 242 serves the functions of both the second resistor 142 and the third resistor 143 of the touch panel of the second embodiment. The second potential detecting unit 252 serves the functions of both the second potential detecting unit 152 and the third potential detecting unit 153 of the touch panel of the second embodiment. Further, the fourth switch SW24 serves the functions of both the fourth switch SW14 and the fifth switch SW15 of the touch panel of the second embodiment.

Configurations other than those described above are the same as or similar to those of the second embodiment.

Fourth Embodiment

In a typical five-wire-type touch panel, a low resistance pattern is formed on the perimeter of the transparent conductive film 21 on the surface thereof facing toward the glass, thereby providing a homogeneous potential distribution. When pressure is applied to the touch panel at two points of touch, the transparent conductive film 11 and the transparent conductive film 21 form parallel-connected resistances whose combined resistance varies in response to the positions of the two points of touch. A change in the combined resistance is detected by an external apparatus by measuring a total resistance including the resistance of the low resistance pattern, so that the magnitude of the detected change is very small and may be smaller than a few ohms. It may be noted that the panel resistance ranges from tens of ohms to hundreds of ohms.

Detecting such a small resistance change as a change in the voltage divided by a potential divider using a fixed resistance may be difficult because the divided voltage may exhibit a change of only a few millivolts at the maximum. Accordingly, there is a need to amplify the divided voltage to a detectable range. When the ratio of the fixed resistance to the panel resistance is 1 to 1, the divided voltage is 2.5 V in the case of a power supply voltage of 5 V. Amplifying such a voltage in a straightforward manner would produce a voltage ranging from tens of voltages to hundreds of voltages, which is difficult to handle. In consideration of this, a voltage of 2.5 V is maintained as a reference voltage, and only a change from this reference voltage is obtained by use of a differential amplifier. Further, a divided voltage of 2.5 V, which varies due to variation in the panel resistance or the fixed resistance, is sampled and held in a given environment by use of a sample and hold circuit.

In the following, a fourth embodiment will be described. The touch panel of this embodiment employs a sample and hold circuit and a differential amplifier situated between a power feeding terminal and a resistor, and further employs a potential detecting unit to measure the output of the differential amplifier. This arrangement enables the accurate detection of the positions of touch as well as the types of gestures by amplifying a detected minute potential change.

Figure 10:
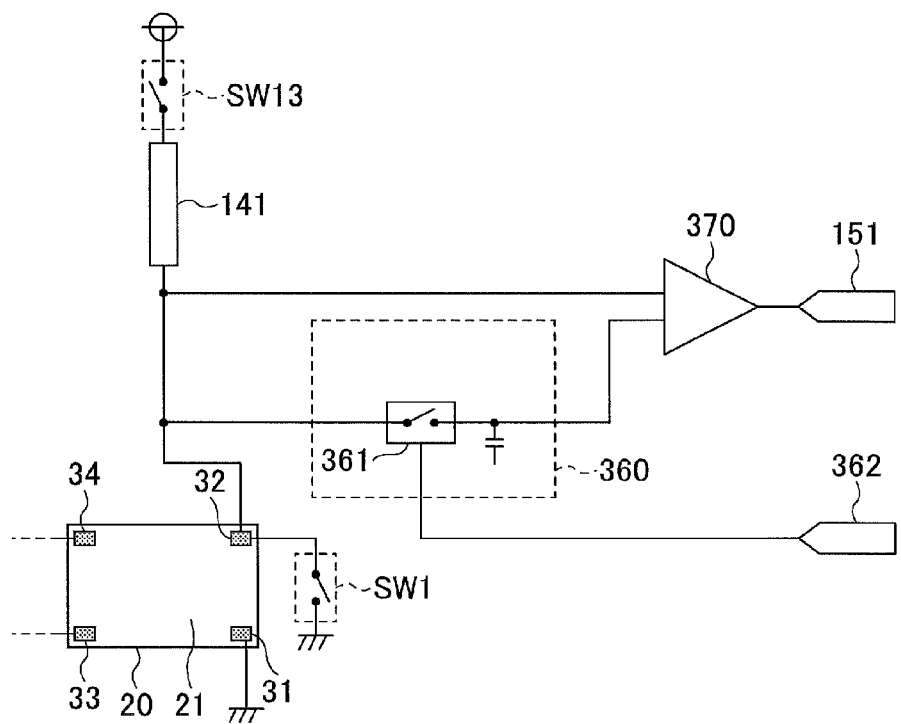
FIG. 10 is an illustrative drawing of a touch panel of a fourth embodiment.
Figure 11:
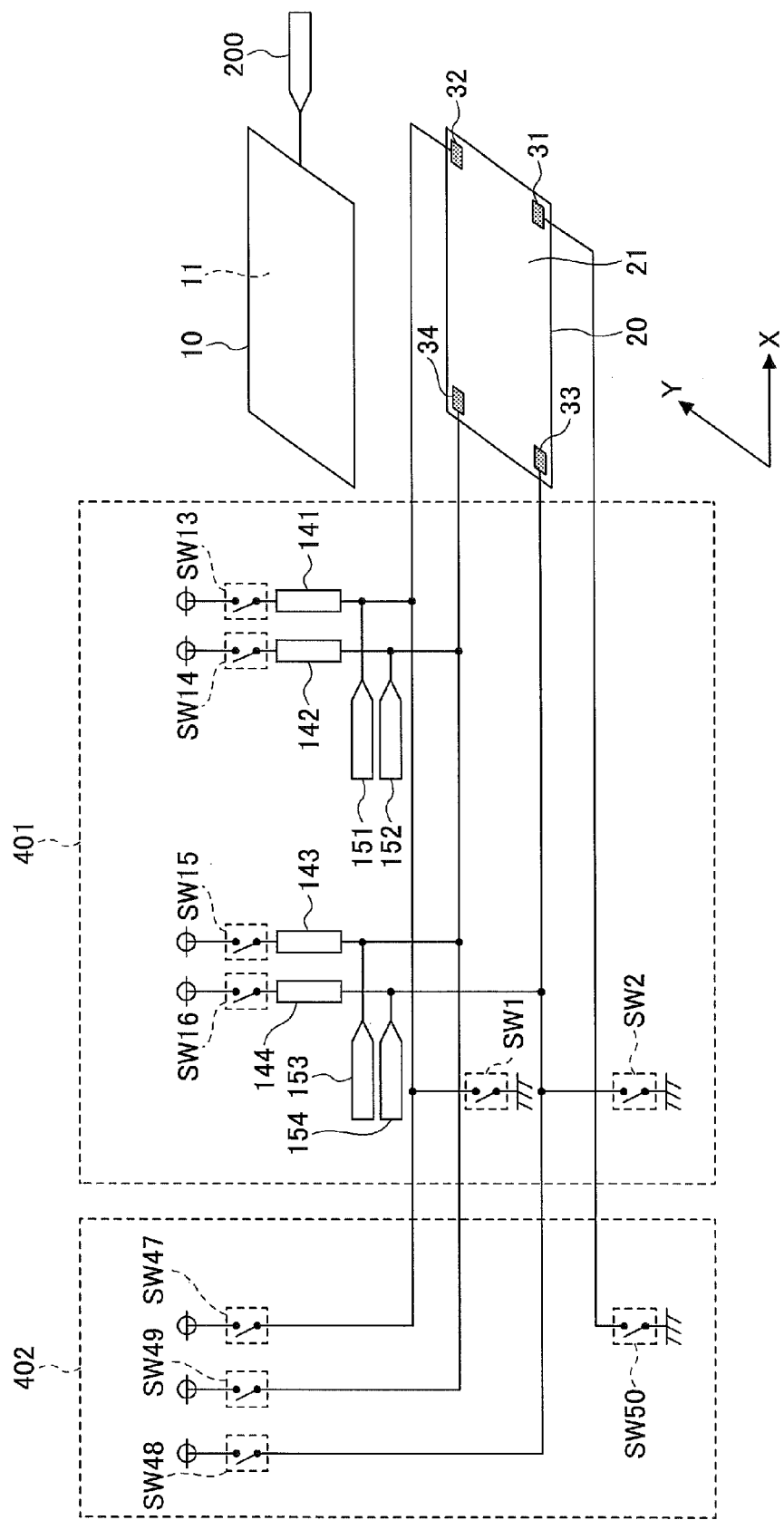
FIG. 11 is a drawing illustrating the structure of a touch panel of a fifth embodiment.

With reference to FIG. 10, a description will be given of the touch panel according to the present embodiment. A description of the present embodiment will be given by referring to an example in which the sample and hold circuit and the differential amplifier are employed in the touch panel of the second embodiment. This is not a limiting example, and the configuration of the present embodiment is also applicable to the touch panels of the first and third embodiments. FIG. 10 illustrates an example in which the sample and hold circuit and the differential amplifier are situated between the first resistor 141 and the second power feeding terminal 32 disposed on the lower electrode substrate 20. The same or similar configuration is also employed with respect to the path between third power feeding terminal 33 and the fourth resistor 144, the path between the fourth power feeding terminal 34 and the second resistor 142, and the path between the fourth power feeding terminal 34 and the third resistor 143.

In the present embodiment, an input terminal of a sample and hold circuit 360 and one of the input terminals of a differential amplifier 370 are connected to the path between the first resistor 141 and the second power feeding terminal 32 disposed on the lower electrode substrate 20. The sample and hold circuit 360 includes a sample and hold switch 361. A sample and hold control unit 362 situated in a controller or the like controls the operation of the sample and hold switch 361. The sample and hold circuit 360 serves to sample and hold a potential that is observed when there is no touch on the touch panel by a finger or the like. Namely, the sample and hold switch 361 is closed when the touch panel is free of touch by a finger or the like, so that the sample and hold circuit 360 samples a potential as observed at the input terminal thereof in such a state. With this arrangement, the sample and hold circuit 360 samples and holds the potential as observed when the touch panel is free of touch by a finger or the like. Subsequently, the sample and hold switch 361 is opened. Operations on the touch panel are performed in the state in which the sample and hold switch 361 is open. In this state, the output terminal of the sample and hold circuit 360 provides the potential as observed when there is no touch on the touch panel by a finger or the like.

The output terminal of the sample and hold circuit 360 is connected to one of the input terminals of the differential amplifier 370, and the other one of the input terminals of the differential amplifier 370 receives a potential observed at a point between the first resistor 141 and the second power feeding terminal 32. The differential amplifier 370 amplifies a difference between the potentials input into the respective input terminals to produce an amplified difference at the output terminal of the differential amplifier 370. The signal output from the output terminal of the differential amplifier 370 is supplied to the first potential detecting unit 151.

In the present embodiment, the signal output from the output terminal of the differential amplifier 370 is a result of amplifying a difference between the potentials input into the respective input terminals of the differential amplifier 370. Accordingly, the first potential detecting unit 151 detects a signal exhibiting a large change obtained by amplifying a change in the potentials. With this arrangement, the positions of touch points and the types of gestures are detected with improved accuracy even when there are multiple touch points on the touch panel.

In the present embodiment, another sample and hold circuit and another differential amplifier are also situated between the third power feeding terminal 33 and the fourth resistor 144. The output of this differential amplifier situated between the third power feeding terminal 33 and the fourth resistor 144 is supplied to the fourth potential detecting unit 154. Further, another sample and hold circuit and another differential amplifier are also situated between the fourth power feeding terminal 34 and the second resistor 142. The output of this differential amplifier situated between the fourth power feeding terminal 34 and the second resistor 142 is supplied to the second potential detecting unit 152. Moreover, another sample and hold circuit and another differential amplifier are also situated between the fourth power feeding terminal 34 and the third resistor 143. The output of this differential amplifier situated between the fourth power feeding terminal 34 and the third resistor 143 is supplied to the third potential detecting unit 153.

Fifth Embodiment

In the following, a fifth embodiment will be described. A touch panel of the present embodiment is directed to a configuration that has the function to detect a single point of touch on the touch panel of the second embodiment. The present embodiment will be described by referring to the touch panel of the second embodiment as an example. This is not a limiting example, and the present embodiment is also applicable to the touch panels of the first and third embodiments.

The touch panel of the present embodiment includes a multi-touch detecting circuit 401 for detecting two or more points of touch and a single-touch detecting circuit 402 for detecting a single point of touch. The multi-touch detecting circuit 401 of the present embodiment is the same as or similar to the configuration employed in the touch panel of the second embodiment.

The single-touch detecting circuit 402 includes a seventh switch SW47, an eighth switch SW48, a ninth switch SW49, and a tenth switch SW50.

Specifically, the second power feeding terminal 32 on the lower electrode substrate 20 is coupled to a first terminal of the seventh switch SW47, and a second terminal of the seventh switch SW47 is coupled to the power supply potential. The first terminal of the first switch SW1 and the first terminal of the seventh switch SW47 are coupled to each other. The first switch SW1 and the seventh switch SW47 are series-connected between the ground potential and the power supply potential.

The third power feeding terminal 33 is coupled to a first terminal of the eighth switch SW48, and a second terminal of the eighth switch SW48 is coupled to the power supply potential. The first terminal of the second switch SW2 and the first terminal of the eighth switch SW48 are coupled to each other. The second switch SW2 and the eighth switch SW48 are series-connected between the ground potential and the power supply potential.

The fourth power feeding terminal 34 is coupled to a first terminal of the ninth switch SW49, and a second terminal of the ninth switch SW49 is coupled to the power supply potential. The first power feeding terminal 31 is coupled to a first terminal of the tenth switch SW50, and a second terminal of the tenth switch SW50 is coupled to the ground potential.

A description will be given of position detection in the touch panel of the present embodiment with reference to FIGS. 12A through 12C.

A description will first be given of position detection in the case of multi-touch by referring to FIG. 12A. In this case, the seventh switch SW47, the eighth switch SW48, and the ninth switch SW49 are open, and the tenth switch SW50 is closed.

In order to perform a measurement in the X-axis direction in the this case, the first switch SW1 is closed, and the second switch SW2 is open, with the third switch SW13 and the fourth switch SW14 being open, and the fifth switch SW15 and the sixth switch SW16 being closed.

In order to perform a measurement in the Y-axis direction, the first switch SW1 is open, and the second switch SW2 is closed, with the third switch SW13 and the fourth switch SW14 being closed, and the fifth switch SW15 and the sixth switch SW16 being open.

A description will next be given of the position detection of a single point of touch and the position detection of a midpoint between two points of touch by referring to FIG. 12B. In this case, the third switch SW13, the fourth switch SW14, and the fifth switch SW15, and the sixth switch SW16 are open.

In order to perform a measurement in the X-axis direction in the this case, the first switch SW1 is closed, and the second switch SW2 is open, with the seventh switch SW47 being open, the eighth switch SW48 and the ninth switch SW49 being closed, and the tenth switch SW50 being closed. With the switches being in the above-noted states, the third power feeding terminal 33 and the fourth power feeding terminal 34 are set to the power supply potential, and the first power feeding terminal 31 and the second power feeding terminal 32 are set to the ground potential, so that a potential gradient in the X-axis direction is formed in the transparent conductive film 21. When pressure is applied to the touch panel, the transparent conductive film 11 comes in contact with the transparent conductive film 21. A detecting unit 200 connected to the transparent conductive film 11 detects a potential generated by such contact with the transparent conductive film 21 that is responsive to the position(s) of contact in the X-axis direction.

In order to perform a measurement in the Y-axis direction, the first switch SW1 is open, and the second switch SW2 is closed, with the seventh switch SW47 being closed, the eighth switch SW48 being open, and the ninth switch SW49 and the tenth switch SW50 being closed. With the switches being in the above-noted states, the second power feeding terminal 32 and the fourth power feeding terminal 34 are set to the power supply potential, and the first power feeding terminal 31 and the third power feeding terminal 33 are set to the ground potential, so that a potential gradient in the Y-axis direction is formed in the transparent conductive film 21. When pressure is applied to the touch panel, the transparent conductive film 11 comes in contact with the transparent conductive film 21. The detecting unit 200 connected to the transparent conductive film 11 detects a potential generated by such contact with the transparent conductive film 21 that is responsive to the position(s) of contact in the Y-axis direction.

A description will further be given of the sampling and holding of a potential when the touch panel of the fourth embodiment is free of touch by a finger or the like by referring to FIG. 12C. In this case, the switches are set in the same manner as in the case of detecting the positions of multi-touch points. That is, the seventh switch SW47, the eighth switch SW48, and the ninth switch SW49 are open, and the tenth switch SW50 is closed.

In order to perform a sample-and-hold operation in the X-axis direction in the this case, the first switch SW1 is closed, and the second switch SW2 is open, with the third switch SW13 and the fourth switch SW14 being open, and the fifth switch SW15 and the sixth switch SW16 being closed.

In order to perform a sample-and-hold operation in the Y-axis direction, the first switch SW1 is open, and the second switch SW2 is closed, with the third switch SW13 and the fourth switch SW14 being closed, and the fifth switch SW15 and the sixth switch SW16 being, open.

Further, although the present invention is not limited to these embodiments, but various variations and modifications may be made without departing from the scope of the present invention.

The present application is based on Japanese priority application No. 2014-034476 filed on Feb. 25, 2014, with the Japanese Patent Office, the entire contents of which are hereby incorporated by reference.

What is claimed is:

1. A touch panel, comprising:
    an upper electrode substrate having a rectangular shape and having an upper conductive film formed thereon;
    a lower electrode substrate having a rectangular shape and having a lower conductive film formed thereon;
    a first power feeding terminal, a second power feeding terminal, a third power feeding terminal, and a fourth power feeding terminal disposed on the lower conductive film at four respective corners of the lower electrode substrate;
    a first switch situated between the second power feeding terminal and a ground potential;
    a second switch situated between the third power feeding terminal and the ground potential;
    a first resistor and a third switch that are series-connected between the second power feeding terminal and a power supply potential;
    a first potential detecting unit configured to detect a potential of the second power feeding terminal;
    a second resistor and a fourth switch that are series-connected between the fourth power feeding terminal and the power supply potential;
    a second potential detecting unit configured to detect a potential of the fourth power feeding terminal;
    a third resistor and a fifth switch that are series-connected between the third power feeding terminal and the power supply potential; and
    a third potential detecting unit configured to detect a potential of the third power feeding terminal.

2. The touch panel as claimed in claim 1, further comprising:
    a fourth resistor and a sixth switch that are series-connected between the fourth power feeding terminal and the power supply potential; and
    a fourth potential detecting unit configured to detect a potential of the fourth power feeding terminal.

3. The touch panel as claimed in claim 2, wherein the first resistor, the second resistor, the third resistor, and the fourth resistor all have a same resistance value.

4. The touch panel as claimed in claim 1, further comprising:
    sample and hold circuits; and
    differential amplifiers,
    wherein any given one of the second power feeding terminal, the third power feeding terminal, and the fourth power feeding terminal is coupled to an input terminal of a corresponding one of the sample and hold circuits and to an input terminal of a corresponding one of the differential amplifiers,
    wherein an output terminal of the corresponding one of the sample and hold circuits is coupled to another input terminal of the corresponding one of the differential amplifiers, and
    wherein output terminals of the differential amplifiers are coupled to the first potential detecting unit, the second potential detecting unit, and the third potential detecting unit.

5. A touch panel, comprising:
    an upper electrode substrate having a rectangular shape and having an upper conductive film formed thereon;
    a lower electrode substrate having a rectangular shape and having a lower conductive film formed thereon;
    a first power feeding terminal, a second power feeding terminal, a third power feeding terminal, and a fourth power feeding terminal disposed on the lower conductive film at four respective corners of the lower electrode substrate;
    a first switch situated between the second power feeding terminal and a ground potential;
    a second switch situated between the third power feeding terminal and the ground potential;
    a third switch having a first terminal thereof coupled to the second power feeding terminal;
    a fourth switch having a first terminal thereof coupled to the fourth power feeding terminal;

a first resistor having a first end thereof coupled to a second terminal of the third switch and to a second terminal of the fourth switch;

a first potential detecting unit configured to detect a potential at a point between the first end of the first resistor and both the second terminal of the third switch and the second terminal of the fourth switch;

a fifth switch having a first terminal thereof coupled to the fourth power feeding terminal;

a sixth switch having a first terminal thereof coupled to the third power feeding terminal;

a second resistor having a first end thereof coupled to a second terminal of the fifth switch and to a second terminal of the sixth switch; and a second potential detecting unit configured to detect a potential at a point between the first end of the second resistor and both the second terminal of the fifth switch and the second terminal of the sixth switch, wherein a second terminal of the first resistor and a second terminal of the second resistor are coupled to a power supply potential.

6. A touch panel, comprising:

an upper electrode substrate having a rectangular shape and having an upper conductive film formed thereon;

a lower electrode substrate having a rectangular shape and having a lower conductive film formed thereon;

a first power feeding terminal, a second power feeding terminal, a third power feeding terminal, and a fourth power feeding terminal disposed on the lower conductive film at four respective corners of the lower electrode substrate;

a first potential detecting unit configured to detect at least one of a potential of the third power feeding terminal and a potential of the fourth power feeding terminal when the third and fourth power feeding terminals are coupled to a first potential, and the first and second power feeding terminals are coupled to a second potential;

a second potential detecting unit configured to detect at least one of a potential of the second power feeding terminal and a potential of the fourth power feeding terminal when the second and fourth power feeding terminals are coupled to the first potential, and the first and third power feeding terminals are coupled to the second potential; and a third potential detecting unit configured to detect a potential of the upper conductive film.

\* \* \* \* \*